June 26, 1962 N. V. FRIEND ET AL 3,041,571

ELECTRICAL COMPONENT RETAINER

Filed Oct. 15, 1958

INVENTORS
Neil V. Friend
BY George W. Malone. Jr

George V. Eltgroth
ATTORNEY

3,041,571
ELECTRICAL COMPONENT RETAINER

Neil V. Friend, Manlius, and George W. Malone, Jr., Clinton, N.Y., assignors to General Electric Company, a corporation of New York Filed Oct. 15, 1958, Ser. No. 767,410
7 Claims. (Cl. 339—75)

This invention relates to electrical component retainers and more particularly to means for maintaining an electrical component in a component socket.

There are many electrical components such as electron or vacuum tubes that are adapted to be plugged into sockets. The tube sockets are generally mechanically fixed to a chassis. Many of the electrical connections between the various electron tubes and other electrical components are via terminals on the tube socket which are in electrical contact via connectors or "pins" extending from the base of the electron tubes.

Although in many applications the engagement of the pins in the base of the electron tube by the accommodating elements of the tube socket is satisfactory, there are some applications where a more positive engagement is required. These applications may be associated with electronic apparatus operating under strict reliability requirements. Other applications wherein the electronic apparatus is subject to vibrations and accelerations also often require supplementary means for retaining the electron tubes in their tube sockets.

Accordingly, many devices have been proposed which help maintain the engagement of the pins of an electron tube in the accommodating elements of the tube socket. However, these devices are relatively complicated, expensive, or require a substantial number of steps in their manufacture and assembly in the electronic apparatus. Similar problems exist with other types of electrical apparatus.

It is, therefore, a general object of the invention to provide improved means for maintaining an electrical component in a component socket.

It is a specific object of the invention to provide an improved electron tube retainer.

It is another object of the invention to provide an inexpensive component retaining means which is both easy to manufacture and easy to incorporate in electrical and electronic apparatus.

It is a further object of the invention to satisfy the above objects with a component retaining means that is highly reliable though relatively inexpensive.

Briefly, the invention is embodied in means for retaining a component adapted to be plugged into a socket. The means comprises an elongated member with first means laterally extending from a portion of the elongated member to engage the socket, and second means laterally extending from another portion of the elongated member for engaging the component.

In one embodiment of the invention the first and second engaging means may be loops, while in another embodiment of the invention the first and second engaging means may be substantially U-shaped members. The socket may be engaged, for example, by positioning the loop or U-shaped member around it prior to attaching the socket to the chassis.

Other objects, features and advantages of the invention will be evident from the following detailed description when read in connection with the accompanying drawings wherein.

Figures 1, 2, 3, 4, 5, 6:
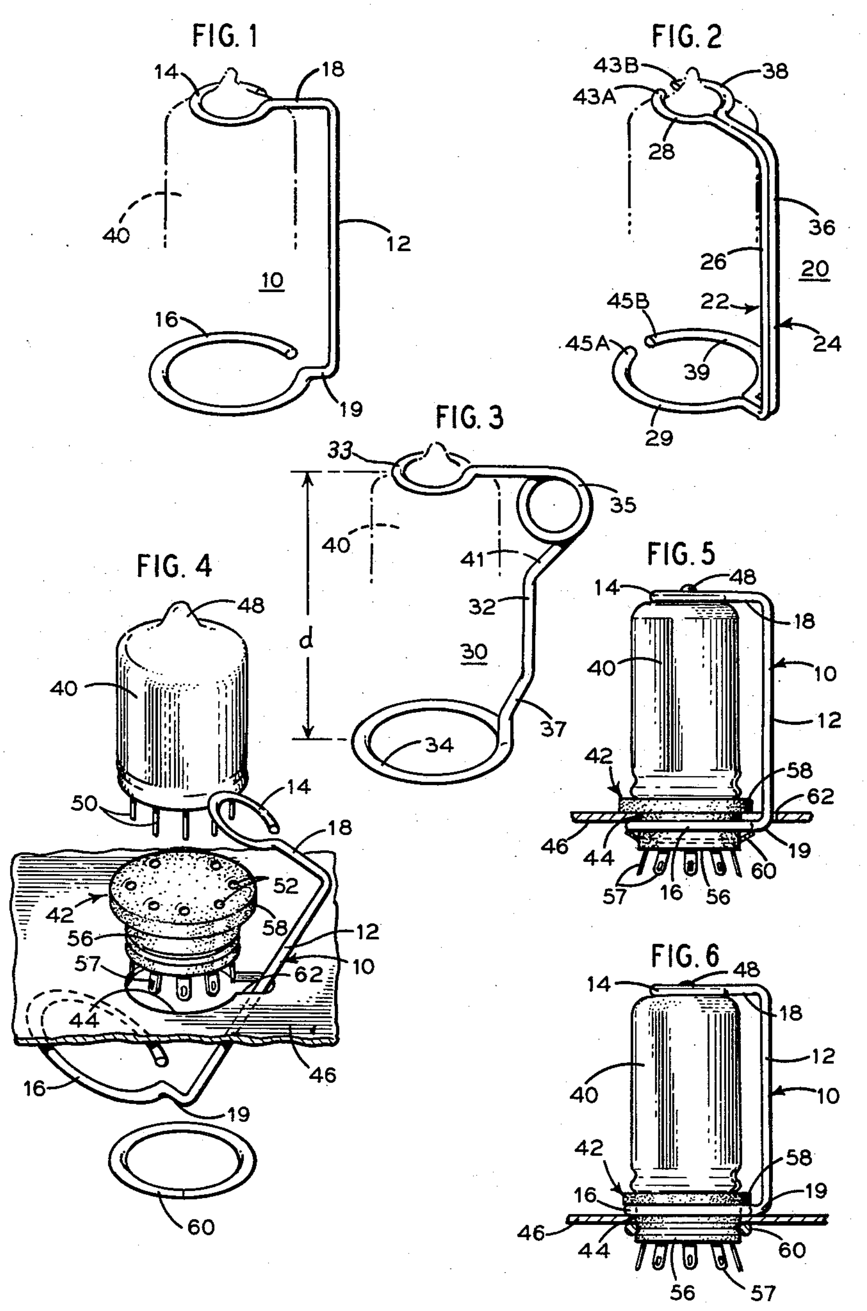
FIGURE 1 is a perspective view of a component retaining means in accordance with one embodiment of the invention which includes loops adapted to engage the socket and component.
FIGURE 2 is a perspective view of another component retaining means in accordance with another embodiment of the invention which includes substantially U-shaped members adapted to engage the socket and component.
FIGURE 3 is a perspective view of a further component retaining means in accordance with yet another embodiment of the invention in which spring means are included in the elongated member.
FIGURE 4 is an exploded perspective view of an electron tube, a tube socket and the component retaining means prior to their assembly on a chassis in accordance with yet another embodiment of the invention.

FIGURE 5 is a side elevation, partially in section, of an electron tube, a tube socket and a component retaining means assembled on a chassis in accordance with a further embodiment of the invention; and FIGURE 6 is another side elevation, partially in section, of an electron tube, a tube socket, and a component retaining means assembled on a chassis in accordance with a still further embodiment of the invention.

Referring to FIGURE 1, a component retaining means 10 is shown fabricated from a length of spring wire. The length of the spring wire of the component retaining means 10 is bent into three sections: a straight section 12 or elongated member; a first loop 14 laterally extending from one end of the straight section 12 for engaging an electrical component; and a second loop 16 laterally extending from the other end of the straight section 12 for engaging a component socket. The first and second loops 14 and 16 are preferably disposed in spaced planes perpendicular to the straight section 12.

In general, the spacing between the planes and the length of the straight section 12 are related to the dimensions of the electrical component. For example, the distance between the component socket and the top of an electrical component held by the component socket may determine this length. In some instances, however, the spacing between the planes may be greater than the length of the straight section 12. This is particularly so when the straight section 12 is bowed to provide spring action for enhancing the retention of the electrical component in the component socket.

Similarly, the inside diameters of the first and second loops 14 and 16 are determined by the dimensions of the electrical component and the component socket. These same dimensions will also determine the lateral displacements of the first and second loops 14 and 16 from the straight section 12. Accordingly, when employing particular electrical components and component sockets, it may be necessary to include lateral extensions 18 and 19 which integrally connect straight section 12 respectively to first loop 14 and second loop 16. It should be noted that although the first loop 14 is shown as circular, other shapes may be employed to accommodate different types of components.

Component retaining means 20, in accordance with another embodiment of the invention, is shown in FIGURE 2. Component retaining means 20 is preferably fabricated from first and second lengths of spring wire 22 and 24. The first length of spring wire 22 is divided into three sections: a straight section 26, a first arcuate section 28 laterally extending from one end of straight section 26, and a second arcuate section 29 laterally extending from the other end of straight section 26. The second length of spring wire 24 is similarly divided into three sections: a straight section 36, a first arcuate section 38 laterally extending from one end of straight section 36, and a second arcuate section 39 laterally extending from the other straight section 36. The straight sections 26 and 36 which are of the same length are joined together by a conventional technique such as welding so that first arcuate sections 28 and 38 are coplanar and second arcuate sections 29 and 39 are also coplanar. Again, the spacing between the planes and the radii of curvature of the arcuate sections 28, 30, 38 and 40 are determined by the electrical components to be retained. Similarly, it may be necessary to provide lateral extensions such as lateral extensions 18 and 19 of the component retaining means 10 of FIGURE 1. It should also be noted that the straight sections 26 and 36 may be bowed.

Although there are a number of similarities between the component retaining means 10 (FIG. 1) and the component retaining means 20 (FIG. 2), there are some important differences. There is a separation between the respective tips 43*a* and 43*b* of the first arcuate sections 28 and 38 of component retaining means 20 to facilitate engagement with certain electrical components. A similar separation exists between the respective tips 45*a* and 45*b* of the second arcuate sections 29 and 39 to facilitate engagement with a component socket. Thus the tips 43*a*, 43*b*, 45*a* and 45*b* may be rounded and inwardly bent and rounded to permit snap fittings.

Although the component retaining means 10 of FIGURE 1 and the component retaining means 20 of FIGURE 2 serve admirably in many applications, FIGURE 3 shows a component retaining means 30 that has further desirable properties which enhance the engagement of the electrical component in a socket by providing a spring means in the elongated member.

In particular, component retaining means 30 is formed from a length of spring wire. The length of spring wire may be divided into three sections: a center section 32 or elongated member; a first loop 33 laterally extending from one end of center section 32 for engaging an electrical component, and a second loop 34 laterally extending from the other end of center section 32 for engaging a component socket. Spring means are provided by forming a longitudinal loop 35 in a portion of center section 32. The longitudinal loop 35 is formed near the end of center section 32 from which first loop 33 extends so that first loop 33 is biased toward second loop 34. Thus when an electrical component having a length greater than distance *d* is accommodated in a component socket, the component is urged into the component socket by longitudinal loop 35 to enhance the engagement.

In order to insure clearance between the longitudinal loop 35 and the electrical component, set backs 37 and 41 are bent into center section 32.

While component retaining means 10, 20 and 30 may be employed with various electrical components such as transistors, capacitors, inductors, crystals, etc., FIGURES 4, 5 and 6 show, by way of example, the component retaining means 10 being employed to maintain the engagement of an electron tube in a tube socket. In particular, as shown in FIGURE 4, the component retaining means 10 retains the engagement of the electron tube 40 in the tube socket 42 which is positioned in a socket hole 44 of a chassis 46. The electron tube 40 is of the type which has a top seal-off tip 48 and base pins 50. The tube socket 42 is of the type having a plurality of pin receptacles 52, a shaft 56 extending downward to form a flange 58, a plurality of terminals 57 extending from the base of the shaft 56, and a locking means 60. Locking means 60 may be a closed, split ring which fits in a peripheral groove (not shown) in shaft 56 or a nut for engaging a threaded end of shaft 56. A closed ring having an inside diameter which is slightly smaller than the outside diameter of the shaft 56 is preferred. The closed ring is forced down over the shaft 56 and is retained in some cases by friction or tight engagement, or in other cases by actually deforming the material of shaft 56 as is illustrated in FIGURE 5. The socket hole 44 has a slot 62 (FIG. 4) to accommodate the straight section 12 of component retaining means 10.

In the assembly operation, component retaining means 10 is passed through socket hole 44 and straight section 12 is fitted in slot 62. Tube socket 42 is positioned in socket hole 44 and loop 16 is fitted about shaft 56 (FIG. 5). Locking means 60 is then fitted to shaft 56 to fix tube socket 42 to chassis 46 and thereby mount component retaining means 10. Electron tube 40 is plugged into tube socket 42 and loop 14 is fitted about top seal-off tip 48 or a corresponding protrusion.

It should be noted that in this embodiment (FIG. 5) the loop 16 is positioned about the portion of the shaft 56 that is on the side of the chassis 46 remote from the flange 58. Such a disposition, while being desirable in some applications, requires cutting the slot 62 in the chassis 46. FIGURE 6 shows an alternate embodiment which does not require the slot 62. Since this embodiment is similar in all but one respect to the embodiment of FIGURE 5, the same reference characters are employed to designate like components. The difference is that the loop 16 of component retaining means 10 is disposed about the portion of the shaft 56 that is between the flange 58 and the chassis 46.

In the assembly operation for the embodiment of the invention shown in FIGURE 6, the shaft 56 of tube socket 42 is passed through loop 16 of component retaining means 10. Tube socket 42 is positioned in socket hole 44 of chassis 46. Locking means 60 is fitted about the portion of the shaft 56 extending through socket hole 44 to fix tube socket 42 to chassis 46 and thereby mount component retaining means 10. Electron tube 40 is plugged in tube socket 42 and loop 14 of component retaining means 10 is fitted about top seal-off tip 48 or similar protrusion of electron tube 40.

It should be noted that in the embodiments shown in FIGURES 5 and 6 the component retaining means 20 of FIGURE 2 can also be used. In this case, instead of fitting the shaft 56 of the tube socket 42 in loop 16 of component retaining means 10 (or second loop 34 of component retaining means 30), a snap fitting of arcuate sections 29 and 39 of component retaining means 20 is made about the shaft 56. Similarly, instead of fitting loop 14 about top seal-off tip 48, a snap fitting of arcuate sections 28 and 38 is required.

There has thus been shown simple means for maintaining an electrical component in a component socket. The component retaining means is very reliable yet relatively inexpensive because of ease of manufacture and incorporation in electrical apparatus.

While only several representative embodiments of the invention have been shown and disclosed in detail, it will now be obvious to those skilled in the art many modifications and variations accomplishing the objects and realizing many of the advantages of the invention but which do not depart from the invention as defined in the following claims.

What is claimed is:

1. In combination, an electron tube, a tube socket, said tube socket having a flange and a shaft axially extending from said flange, a chassis, said chassis having a hole for accommodating the shaft of said tube socket, an elongated member disposed adjacent said electron tube and said tube socket, said elongated member being parallel to the axis of said electron tube, first engaging means laterally extending from one end of said elongated member and fitting substantially around the top of said electron tube, second engaging means laterally extending from the other end of said elongated member for engaging and fitting substantially around a portion of said shaft below said chassis and said flange said first and second engaging means cooperating to clamp said socket to said chassis and securing said tube and said socket, and means for fixing said tube socket to said chassis.

2. In combination, a tube socket adapted to retain an electron tube, said tube socket having a flange and a shaft portion axially extending from said flange, a chassis, said chassis having a hole for accommodating the shaft portion of said tube socket, and a slot extending from said hole, an elongated member disposed adjacent to said tube socket and the electron tube maintained therein and extending through said slot, first engaging means extending laterally from one end of said elongated member surrounding a portion of an electron tube supported in said socket, second engaging means extending laterally from the other end of said elongated member and substantially surrounding the shaft portion extending beyond the side of said chassis remote from said electron tube, said second engaging means surrounding the shaft portion of said socket for clamping the socket to said chassis, and locking means for fixing said tube socket to said chassis.

3. The combination of claim 2 wherein said second engaging means is a loop of wire.

4. The combination of claim 2 wherein said second engaging means is a substantially U-shaped member of wire.

5. The combination of claim 2 wherein said elongated member includes spring means for urging said electron tube in said tube socket.

6. The combination of claim 2 wherein said locking means is a ring fitted around said shaft on one side of said chassis, said ring having an inside diameter slightly smaller than the outside diameter of said shaft of said tube socket whereby said ring tightly engages said shaft.

7. The combination of claim 2 wherein said shaft is of a deformable material and said locking means is a ring fitted around said shaft on one side of said chassis, said ring having an inside diameter slightly smaller than the outside diameter of said shaft whereby said ring deforms the material of said shaft.

References Cited in the file of this patent

UNITED STATES PATENTS

| | | |
|---|---|---|
| 1,940,325 | Rabezzana | Dec. 19, 1933 |
| 2,325,770 | Henderson | Aug. 3, 1943 |
| 2,446,461 | Diver | Aug. 3, 1948 |
| 2,449,646 | Emde | Sept. 21, 1948 |
| 2,468,737 | Davis | May 3, 1949 |
| 2,501,284 | Miller et al. | Mar. 21, 1950 |
| 2,575,601 | Staver | Nov. 20, 1951 |
| 2,697,817 | Fratila | Dec. 21, 1954 |
| 2,768,360 | Goldstaub | Oct. 23, 1956 |
| 2,773,973 | Hoard et al. | Dec. 11, 1956 |
| 2,852,594 | Amand | Sept. 16, 1958 |

FOREIGN PATENTS

| | | |
|---|---|---|
| 508,349 | Great Britain | June 29, 1939 |